United States Patent
Valasek et al.

(10) Patent No.: US 12,513,135 B2
(45) Date of Patent: Dec. 30, 2025

(54) ONE-WAY SEGREGATION OF AV SUBSYSTEMS AND USER DEVICES

(71) Applicant: GM Cruise Holdings LLC, San Francisco, CA (US)

(72) Inventors: Christopher Valasek, Pittsburgh, PA (US); Charles Miller, St. Louis, MO (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 305 days.

(21) Appl. No.: 18/057,458

(22) Filed: Nov. 21, 2022

(65) Prior Publication Data

US 2024/0171568 A1    May 23, 2024

(51) Int. Cl.
*H04L 9/40* (2022.01)
*G06F 13/42* (2006.01)

(52) U.S. Cl.
CPC ........ *H04L 63/083* (2013.01); *G06F 13/4247* (2013.01); *H04L 63/123* (2013.01); *H04L 63/126* (2013.01)

(58) Field of Classification Search
CPC ... H04L 63/083; H04L 63/123; H04L 63/126; G06F 13/4247
See application file for complete search history.

(56) References Cited

U.S. PATENT DOCUMENTS

| | | | | |
|---|---|---|---|---|
| 2005/0240758 | A1* | 10/2005 | Lord | H04L 63/101 713/153 |
| 2012/0179852 | A1* | 7/2012 | McEvoy | H04L 63/0209 710/313 |
| 2013/0097283 | A1* | 4/2013 | Menoher | H04L 63/0227 709/217 |
| 2014/0195808 | A1* | 7/2014 | Lortz | H04L 63/0263 713/170 |
| 2015/0341380 | A1* | 11/2015 | Heo | H04L 63/1458 726/22 |
| 2016/0197944 | A1* | 7/2016 | Allouche | H04L 63/1416 726/23 |
| 2016/0261425 | A1* | 9/2016 | Horton | H04L 67/1097 |
| 2016/0381068 | A1* | 12/2016 | Galula | G07C 5/0816 726/23 |
| 2018/0091509 | A1* | 3/2018 | Lu | H04L 9/3268 |
| 2019/0077414 | A1* | 3/2019 | Garcia | G06V 20/58 |

(Continued)

*Primary Examiner* — Lynn D Feild
*Assistant Examiner* — Ethan V Vo
(74) *Attorney, Agent, or Firm* — CANTOR COLBURN LLP

(57) ABSTRACT

Malicious users (or hackers) can take advantage of user devices on or communicably connected to an autonomous vehicle (AV) to gain unauthorized access to AV subsystems (e.g., AV compute system, AV sensors, AV controls system, and AV cabin system). To address this concern, a one-way Ethernet communication link can be placed between the AV subsystems and the user devices. The one-way communication link can physically ensure that the user devices may only receive content from the AV systems, and that the user devices may not send data to the AV systems on the one-way communication link. A feature-limited backchannel that may be normally used for transporting audio data on a daisy-chained bus can be used by the user devices to transmit (8-bit) code words that correspond to specific messages to convey messages back to the AV systems.

20 Claims, 9 Drawing Sheets

(56) References Cited

U.S. PATENT DOCUMENTS

| | | | |
|---|---|---|---|
| 2019/0195644 A1* | 6/2019 | Scheufler | H04L 63/105 |
| 2020/0150653 A1* | 5/2020 | Goldman | H04W 4/024 |
| 2020/0226274 A1* | 7/2020 | Juliato | G06F 21/62 |
| 2021/0114606 A1* | 4/2021 | Alvarez | B60W 60/00188 |
| 2021/0176223 A1* | 6/2021 | Falk | H04L 63/0281 |
| 2021/0258297 A1* | 8/2021 | Wyseur | H04L 63/083 |
| 2022/0182404 A1* | 6/2022 | Kishikawa | H04L 63/02 |
| 2022/0272122 A1* | 8/2022 | Kaabouch | H04W 12/122 |

\* cited by examiner

ONE-WAY SEGREGATION OF AV SUBSYSTEMS AND USER DEVICES

BACKGROUND

1. Technical Field

The present disclosure generally relates to autonomous vehicles and, more specifically, to providing added cybersecurity to autonomous vehicles.

2. Introduction

Autonomous vehicles (AVs), also known as self-driving cars, and driverless vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize geographical information and semantic objects (such as parking spots, lane boundaries, intersections, crosswalks, stop signs, traffic lights) for facilitating the vehicles in making driving decisions. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
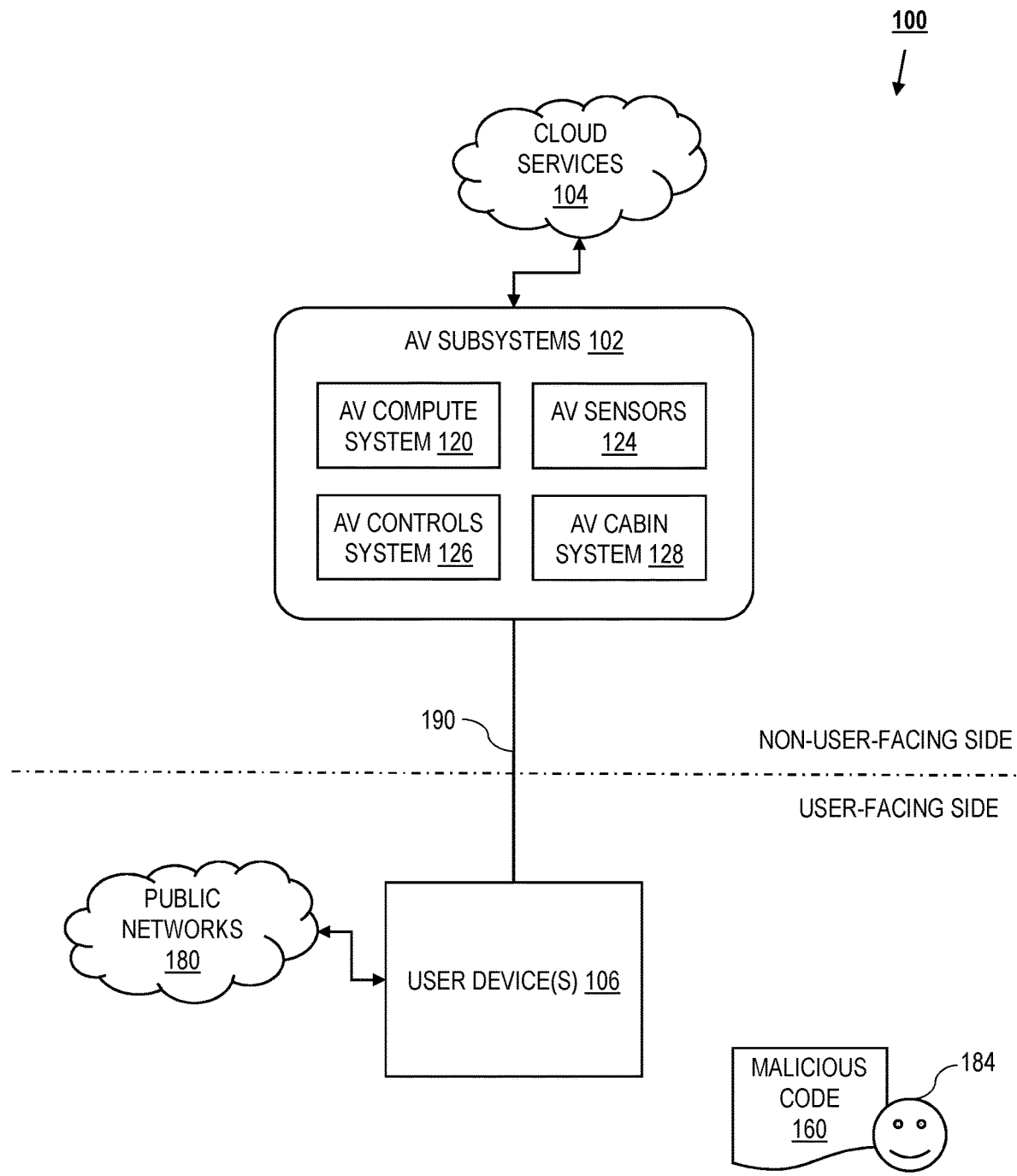
FIG. 1 illustrates potential cybersecurity security risks in an autonomous vehicle, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

AVs can provide many benefits. For instance, AVs may have the potential to transform urban living by offering opportunity for efficient, accessible, and affordable transportation. An AV may be equipped with various sensors to sense an environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from a starting position to a destination). As part of planning, the AV may access map information and localize itself based on location information (e.g., from location sensors) and the map information. Subsequently, instructions can be sent to a controller to control the AV (e.g., for steering, accelerating, decelerating, braking, etc.) according to the planned path.

The operations of perception, prediction, planning, and control at an AV may be implemented using a combination of hardware and software components, together forming an AV compute system. For instance, an AV stack or AV compute process performing the perception, prediction, planning, and control may be implemented as software code or firmware code. The AV stack or AV compute process (the software and/or firmware code) may be executed on processor(s) (e.g., general processors, central processors (CPUs), graphical processors (GPUs), digital signal processors (DSPs), ASIC, etc.) and/or any other hardware processing components on the AV. Additionally, the AV stack or AV compute process may communicate with various hardware components (e.g., on-board sensors and control system of the AV) and/or with an AV infrastructure over a network.

AVs can be particularly useful as rideshare or ridehail vehicles to offer efficient and enjoyable transportation. Passengers of these AVs may interact with user (computing) devices. For instance, a passenger may be using a user-facing device provided by an AV, such as a tablet. The tablet may allow the passenger to control a radio or cabin temperature. In another instance, a passenger may bring a user (computing) device and connect the device to a WiFi hotspot provided by the AV, a Bluetooth connection to play audio from the user (computing) device, or plug in a power cable to an outlet in the AV to charge the device. These user devices are conveniently used to provide information and entertainment to the passengers while riding in the AV.

When an AV provides a device that can a user may interact with, the device may be a potential entry point for a malicious user to gain unauthorized access to security-sensitive subsystems of the AV, such as the AV stack or AV compute process. When users can bring a device and connect the device to a communication network provided by the AV, e.g., through a wired or wireless connection, the device may also be a potential entry point for a malicious user to gain unauthorized access to security-sensitive subsystems of the AV.

Malicious users (or hackers) can take advantage of user devices on or communicably connected to an autonomous vehicle (AV) to gain unauthorized access to AV subsystems (e.g., AV compute system, AV sensors, AV controls system, and AV cabin system). To address this concern, a one-way Ethernet communication link can be placed between the AV subsystems and the user devices. The one-way communication link can physically ensure that the user devices may only receive content from the AV systems, and that the user devices may not send data to the AV systems on the one-way communication link. A feature-limited backchannel that may be normally used for transporting audio data on a daisy-chained bus can be used by the user devices to transmit (8-bit) code words that correspond to specific messages to convey messages back to the AV systems.

Cybersecurity Threats in an AV

FIG. 1 illustrates potential cybersecurity security risks in an autonomous vehicle, according to some aspects of the disclosed technology. Diagram 100 illustrates a networked environment of an AV, which may include AV subsystems 102 and user device(s) 106. AV subsystems 102 and user device(s) 106 may be communicably coupled over a wired or wireless network connection 190.

AV subsystems 102 may include AV compute system 120, AV sensors 124, AV controls system 126, and AV cabin system 128. AV compute system 120 may include hardware and software components for performing perception, prediction, planning, and control of an AV.

AV sensors 124 may include one or more cameras, one or more microphones, one or more Light Detection and Ranging (LIDAR) sensors, one or more Radio Detection and Ranging (RADAR) sensors, one or more pressure sensors, one or more time-of-flight sensors, one or more collision sensors, one or more temperature sensors, one or more weight sensors, one or more tire pressure sensors, etc. AV sensors 124 can generate sensor data, which can be used by AV subsystems 102 for operating the AV.

AV controls system 126 may include vehicle propulsion system, steering system, safety system, sensor wipers, windshield wipers, etc.

AV cabin system 128 may include windows, doors, locks, heating, air conditioning, AM/FM/satellite radio system, multi-media player, cabin monitoring system, one or more occupancy sensors, etc.

Examples of user device(s) 106 include: a tablet built into the cabin of the AV, touch-sensitive display devices, computing devices with user interfaces, bring your own user devices (e.g., wearables, laptops, mobile phones, tablets, virtual/augmented reality headsets).

AV subsystems 102 may communicate with cloud services 104. Cloud services 104 may implement ridesharing (or ridehailing) platform. Cloud services 104 may implement fleet management services to manage a fleet of autonomous vehicles. Cloud services 104 and manufacturers of the AV have control over which AVs (and their AV subsystems 102) are authorized to access these cloud services 104. Various security measures (dealing with authentication and authorization) can be implemented to ensure that communications between AV subsystems 102 and cloud services 104 are sufficiently secure. Additionally, users (such as passengers) would rarely have physical or virtual access to AV subsystems 102 and cloud services 104, since they are not user-facing. Therefore, the AV subsystems 102 and cloud services 104 are less likely to be a vulnerable point of entry that may compromise the AV subsystems 102.

Users, such as passengers of an AV, would have direct physical access to user device(s) 106, which may be communicably coupled to AV subsystems 102 via network connection 190. Also, user device(s) 106 may have access to public networks 180 such as the Internet, which may make user device(s) 106 vulnerable to other users on the public networks 180. Therefore, the user device(s) 106, being user-facing, may be more likely to be a vulnerable point of entry that may compromise the AV subsystem 102. For instance, a malicious user 184 may attempt to inject malicious code 160 (or scripts) to be executed on AV subsystems 102 via the user-facing side having user device(s) 106, and public networks 180. Malicious code 160 injected to AV subsystems 102 may cause AV subsystems 102 to not behave as intended. Accordingly, the user-facing side is less trusted than the non-user-facing side.

One possible mitigation is to provide a software-based firewall on network connection 190, to prevent certain types of data traffic from being able to be sent from the user-facing side to the non-user-facing side. However, software-based firewall is not guaranteed to have no vulnerabilities or flaws in the software-based firewall to ensure that code injection cannot occur. Audits on software-firewalls can take up a lot of time and resources as well. Software-based firewalls may need to be maintained, routinely updated, and/or monitored, and may be prone to user errors and mistakes. Malicious users may take advantage of any vulnerability present at any point in time to gain unauthorized access to AV subsystems 102.

Figure 2:
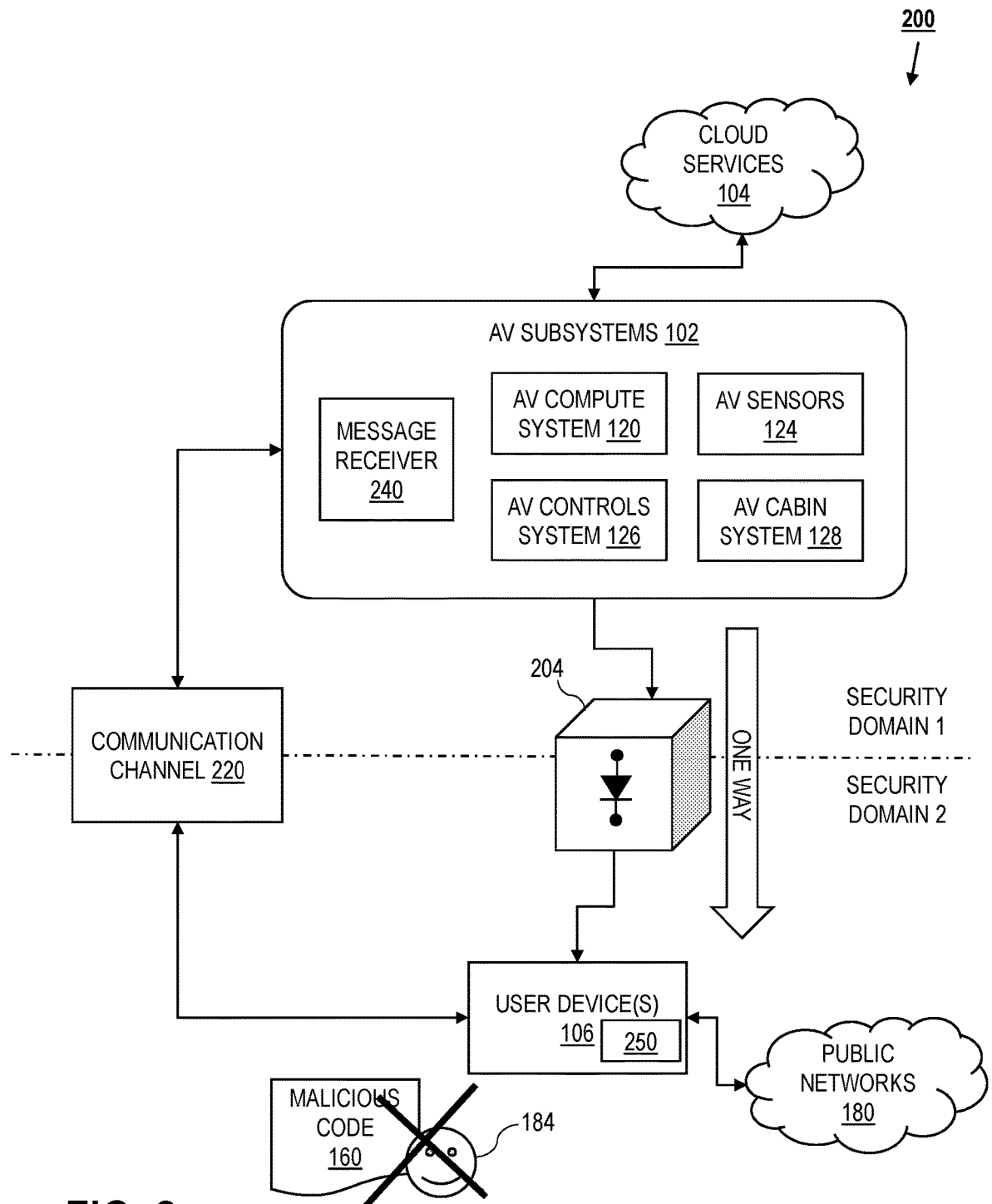
FIG. 2 illustrates one-way segregation of AV subsystems and user devices, and a backchannel for transmitting code words, according to some aspects of the disclosed technology.
Figure 3:
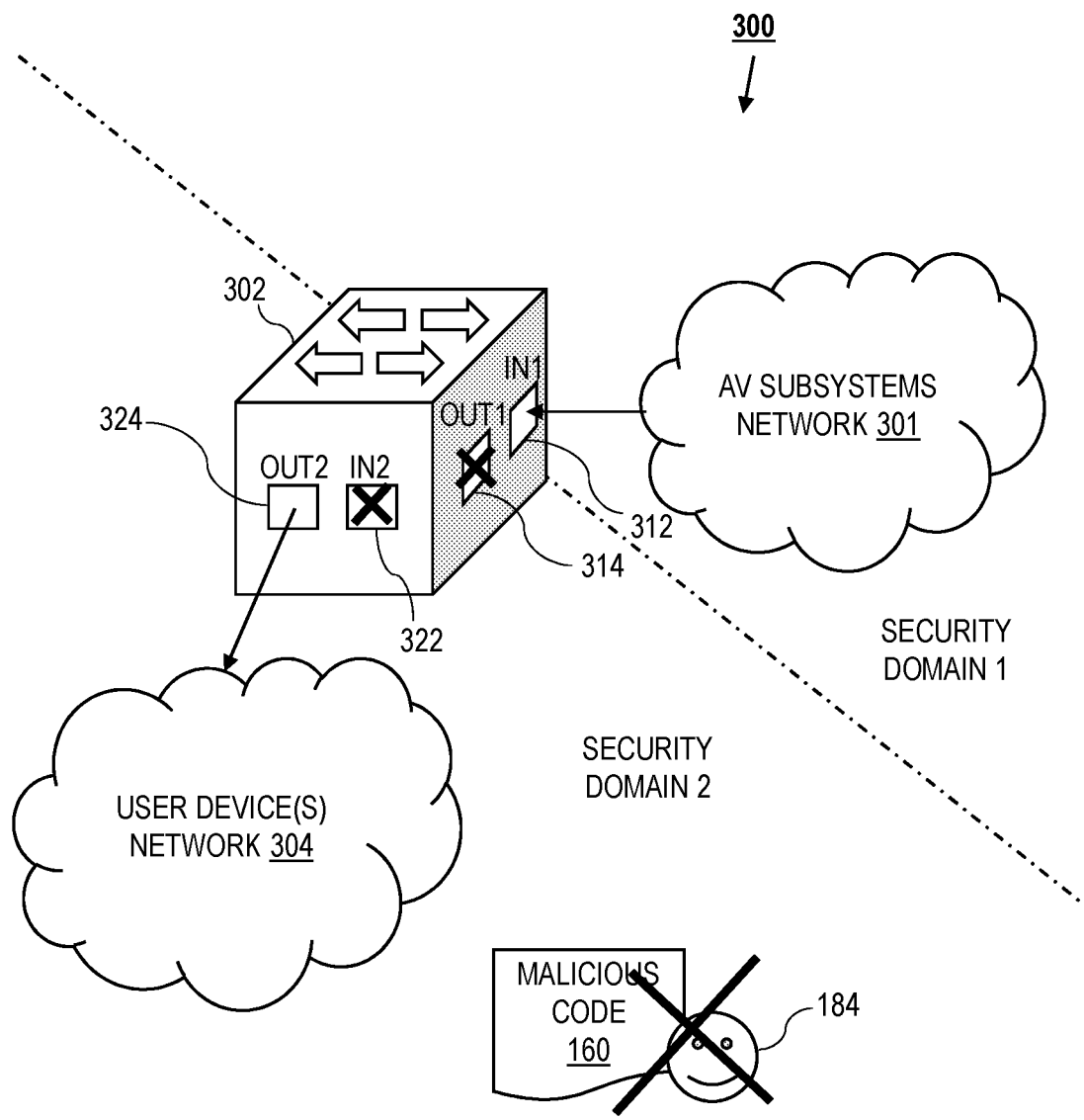
FIG. 3 illustrates physical implementation of a one-way communication link between an AV subsystems network, according to some aspects of the disclosed technology.

Segregating Security Domains Using a One-Way Communication Link and Providing a Backchannel to Send Code Words FIG. 2 illustrates one-way segregation of AV subsystems and user devices, and a backchannel for transmitting code words, according to some aspects of the disclosed technology. Diagram 200 illustrates two different security domains. Security domain 1 (the more trusted side) may correspond to non-user-facing side in diagram 100 of FIG. 1, and security domain 2 (the less trusted side) may correspond to user-facing side in diagram 100 of FIG. 1. Security domain 1 can be considered one network, and security domain 2 can be considered another network. A one-way communication link, for example, a one-way data diode 204, may be provided between the two networks, i.e., security domain 1 and security domain 2. The one-way data diode 204 can ensure that data traffic only flows from the network having the AV subsystems 102 to the network having the user device(s) 106. Also, the one-way data diode 204 can ensure that data traffic is not permitted to travel from the network having the user device(s) 106 to the network having the AV subsystems 102. A one-way data diode 204 may be implemented differently depending on implementation and/or the hardware mechanisms used in data transfer. One example is illustrated in FIG. 3.

The one-way data diode 204 provides physical cybersecurity, since data traffic is prevented, by physical hardware-implemented measures, to be transmitted from user device(s) 106 to AV subsystems 102 through the one-way data diode 204. A one-way data diode 204 can be more secure than providing a software-based firewall, since software is not guaranteed to not have flaws, and the one-way data diode 204 can guarantee that data traffic cannot flow from the user device(s) 106 to AV subsystems 102. An exemplary implementation of a one-way data diode 204 is illustrated in FIG. 3.

The one-way data diode 204 advantageously allow content to be sent from the network having the AV subsystems 102 to user device(s) 106, e.g., to offer information, interaction, and/or entertainment to passenger(s) in the AV. Content can include data streams from AV sensors 124 (e.g., camera feed from camera(s) mounted on the AV), trip information from AV compute system 120 (and/or cloud services 104), driving maneuver information from the AV compute system 120, state information of AV cabin system 128, data streams from other AVs managed by cloud services 104, infotainment content from AV cabin system 128 (e.g., radio audio streams), infotainment content from cloud services 104, and string messages to a passenger of the AV (e.g., from AV subsystems 102). Examples of string messages can include, "Is the trip going well?", "Buckle your seatbelt.", "Are you ready to go?", "Don't forget your items in the cabin.", "Left-turn approaching", "Red light ahead.", "We are stopped to let someone cross an intersection.", "We are waiting for our turn to drive through the 4-way stop.", "We are waiting for another rider to join us." etc.

In some cases, the user device(s) 106 may need to convey messages back to AV subsystems 102. For instance, a response may be warranted in response to a message that is sent from the AV subsystems 102 to user device(s) 106. In another instance, a passenger may wish to send a command to the AV subsystems 102, e.g., to change a setting of the AV subsystem 102 or command the AV subsystem 102 to perform a specific action. In yet another instance, a passenger may wish to send a message to the AV subsystems request content from AV subsystems 102.

To allow for some communication from security domain 2 back to security domain 1, a non-feature rich, limited communication channel 220 (sometimes referred to herein as a backchannel) may be used to allow transmission of code words from security domain 2 back to security domain 1. A limited set of code words and corresponding messages can be provided to an application 250 on user device(s). The application 250 can transmit a code word via communication channel 220. The code word can be received and parsed/interpreted by a message receiver 240 in AV subsystems 102 to determine the message being conveyed by the code word.

Code words can be encoded as a data word, i.e., a set of binary digits or bits. A predetermined number of bits can be allocated or used to encode a limited set of code words to be sent on communication channel 220. If N bits are used (N being the bit width of the code word), $2^N$ code words are available for use (e.g., to convey $2^N$ different possible messages). For instance, code words can be encoded and transmitted in a byte of data on communication channel 220. The communication channel 220 may have a defined data packet format that includes certain number of free/reserved bits that can be used to transmit the code word. The code word can be included in a data packet, and transmitted from user device(s) 106 to AV subsystems 102. One exemplary code word can have less than or equal to 4 bits. One exemplary code word can have less than or equal to 8 bits.

Because the communication channel 220 is limited to being able to transmit code words that correspond to a predetermined set of predefined messages (preferably controlled and defined by security domain 1), a malicious user 184 may have a more difficult time to use the communication channel 220 to inject code into security domain 1 or gain access to security domain 1. Options for a malicious user 184 to use the communication channel 220 to cause unintended operations to be executed by AV subsystems 102 may be limited.

Physical Implementation of the One-Way Data Diode

FIG. 3 illustrates physical implementation of a one-way communication link between an AV subsystems network, according to some aspects of the disclosed technology. In diagram 300, AV subsystems network 301 (e.g., network having AV subsystems 102 in FIG. 2) and user device(s) network 304 (e.g., network having user device(s) 106) can be communicably coupled together via switch 302. In some cases, switch 302 is an Ethernet switch. Switch 302 can implement the one-way data diode 204 seen in FIG. 2 to provide one-way segregation between security domain 1 and security domain 2. The one-way communication link provided by switch 302 implementing the one-way data diode 204 physically does not pass data traffic from the user device to the one or more subsystems of the autonomous vehicle.

In some cases, switch 302 may provide network switching. Network switching can be performed on electrical signals or optical signals. Switch 302 may have input ports (to receive signals) and output ports (to transmit signals). The ports include electrical pins or optical receivers/transmitters that allow for data signals to be transmitted and received. Switch 302 can be configured to pass data packets (e.g., data traffic) received at a specific input port to a specified destination that is reachable via a specific output port.

AV subsystems network 301 may be communicably coupled to input port IN1 312 so that switch 302 can receive data traffic from AV subsystems network 301. User device(s) network 304 communicably coupled to output port OUT2 324 so that switch 302 can pass data traffic from AV subsystems network 301 to user device(s) network 304.

If destined to user device(s) network 304, the data traffic from AV subsystems network 301 received by switch 302 at input port IN1 314 can be passed by switch 302 to user device(s) network 304 via output port OUT2 324. Accordingly, AV subsystems in AV subsystems network 301 can transmit content to user device(s) in user device(s) network 304.

To physically prevent data traffic from being able to travel from user device(s) network 304 to AV subsystems network 301, input port IN2 322 may be physically removed, closed, or disabled to ensure no electrical/optical signals can be conducted through the input port IN1 314 to prevent user device(s) network 304 from being able to transmit any data traffic to any network connected to switch 302, including AV subsystems network 301. For instance, Ethernet cable connectors connecting user device(s) network 304 to switch 302 can be crimped in a manner that omits an electrical wire connection to the input port IN2 322. In some cases, the copper pin at the input port IN2 322 may be physically removed from switch 302 to disable the output port input port IN2 322.

Optionally, the output port OUT1 314 may be physically removed, closed, or disabled to ensure no electrical/optical signals can be conducted through the output port OUT1 314 to prevent AV subsystems network 301 from receiving data traffic from any network connected to switch 302, including user device(s) network 304. For instance, Ethernet cable connectors connecting AV subsystems network 301 to switch 302 can be crimped in a manner that omits an electrical wire connection to the output port OUT 314. In some cases, the copper pin at the output port OUT1 314 may be physically removed from switch 302 to disable the output port OUT 314.

Using a Limited Backchannel to Allow Some Code Words to be Sent from the User Device(s) to the AV Subsystems Providing any backchannel can introduce significant cybersecurity risks. Therefore, selecting a suitable backchannel and implementing a communication protocol to be used on the backchannel are not trivial.

Figure 4:
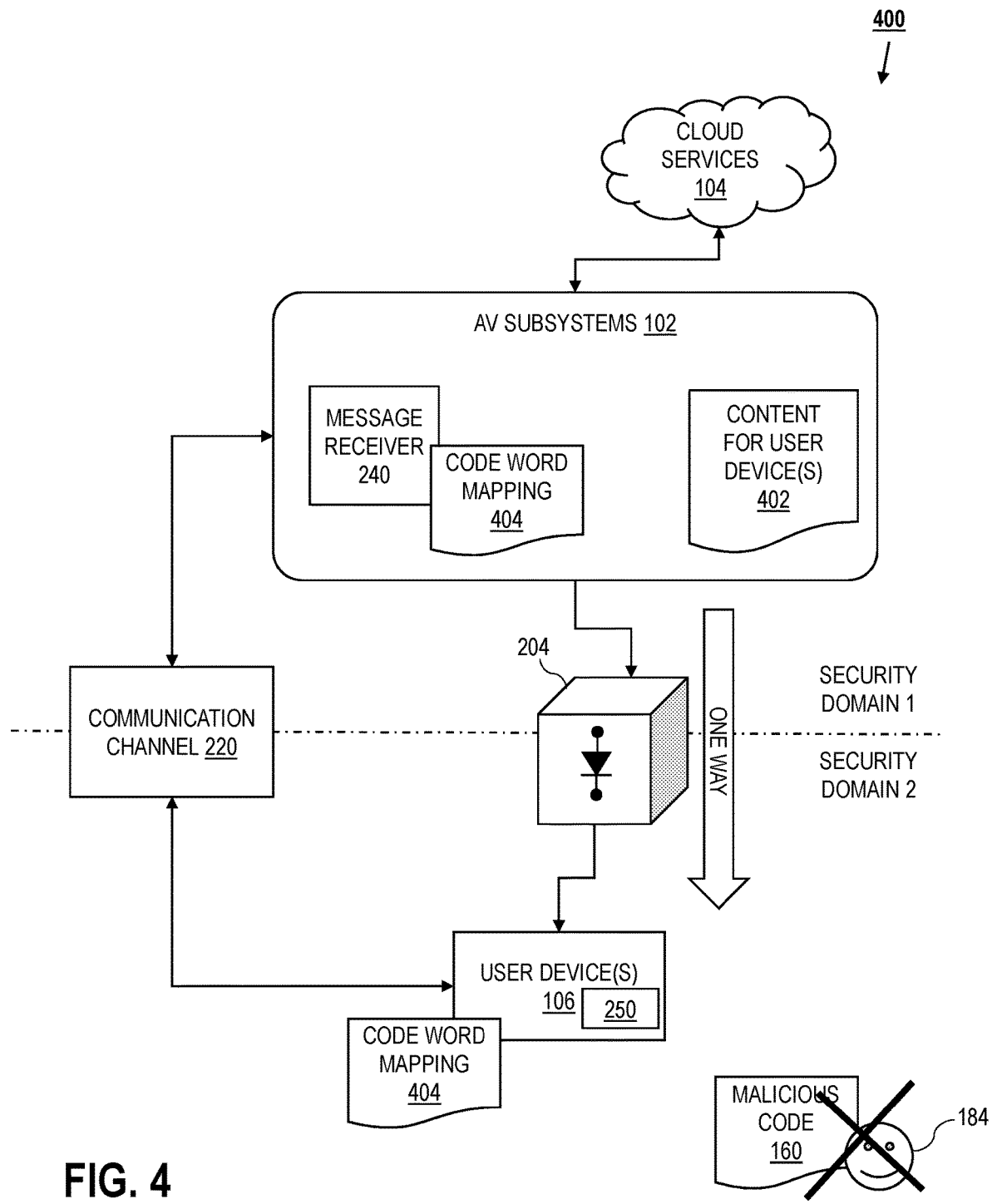
FIG. 4 illustrates transmitting and receiving code words via a backchannel, according to some aspects of the disclosed technology.

FIG. 4 illustrates transmitting and receiving code words via a backchannel, according to some aspects of the disclosed technology. Diagram 400 illustrates details of an exemplary communication channel 220 and communication protocol that can be used as a suitable backchannel.

In some cases, communication channel 220 in an autonomous vehicle may be an audio communication bus that is typically and primarily used for transporting audio data for infotainment applications and active noise cancellation applications. The audio communication bus may be a daisy-chained communication bus used for transmitting/transporting audio data to devices connected to the daisy-chained communication bus via transceiver chips. User device(s) 106 may be communicably coupled to the communication bus, e.g., to transmit and/or receive audio data.

In some cases, communication channel 220 is provided by a single, 2-wire unshielded twisted pair cable, where devices are connected to nodes on the cable, via transceiver chips, to form a daisy-chained network of devices. The transceiver chips can cooperate to offer synchronous communication on the cable. Data packets, control data packets, clock signal, and power signal, can be transported on the cable. The AV subsystems 102 may be communicably coupled to the communication channel 220. The user device(s) 106 may be communicably coupled to the communication channel 220. The AV subsystems 102 and the user device(s) 106 may communicate with each other on the daisy-chained network.

Devices communicably coupled to the communication channel 220 may communicate with other devices coupled to the communication channel 220 using data packets that are in format specified by the transceiver chips. Malformed data packets may be discarded by the communication channel 220.

User device(s) 106 may be receiving content for user device(s) 402 from AV subsystems 102 via one-way data diode 204.

In some cases, AV subsystems 102 may obtain or determine code word mapping 404, having mapping between different code words and different corresponding messages. AV subsystems 102 may provide the code word mapping 404 to user device(s) 106 via the one-way data diode 204.

Application 250 may determine a message to be conveyed as a code word. In some cases, the message is a response to a request from the AV subsystems 102. In some cases, the message is a command (e.g., based on user input provided to user device(s) 106 to change a setting of the AV subsystems 102. Application 250, running on user device(s) 106, may access the code word mapping 404 (e.g., lookup the corresponding code word that is mapped to the message to be conveyed) to determine a suitable code word to send to message receiver 240 via communication channel 220.

The code word can be encoded in a data packet being transported by communication channel 220. Message receiver 240 can receive the data packet and extract the code word from the data packet. Message receiver 240 may determine the corresponding message by looking up the code word in the code word mapping 404. AV subsystems 102 can perform an action based on the corresponding message extracted from the data packet. If the corresponding message is a command, the AV subsystems 102 may execute the command in accordance with the message.

In some cases, message receiver 240 may monitor data packets and code words therein received via communication channel 220 to offer additional cybersecurity. For example, the message receiver 240 may monitor for one or more unexpected code words being received on the communication channel 220. A code word can be unexpected due to the timing of the code word being received. If no code words are expected to be received by message receiver 240 during a certain period of time (e.g., there is no passenger in the AV, a code word was received when no code words were specifically requested, etc.). Another code word can be unexpected if there is no corresponding message to the received code word (e.g., there is no mapped message to the code word).

Unexpected code words can be a sign of suspicious activity in security domain 2. In some cases, in response to receiving the one or more unexpected code words, the message receiver 240 can cease to process (the one or more unexpected code words and) further code words received on communication channel 220. Ceasing processing of the unexpected code word (e.g., dropping the code word) can prevent unauthorized operations to be performed by the AV subsystems 102. Ceasing processing of further code words can disallow any more operations to be triggered by a (potentially) compromised communication backchannel. In some cases, in response to receiving the one or more unexpected code words, message receiver 240 can alert the AV subsystems 102 of an anomaly or suspicious activity.

Implementing message receiver 240 to process code words (only) has additional benefits. For the message receiver 240, software code that is written to process code words can be made more secure than software code that is written to process arbitrary data (e.g., strings, audio, images, etc.). Software code that is written to process code words are simpler, and by nature, may be less prone to programming errors. Software code that has less programming errors are less vulnerable to attacks. Also, testing, auditing, and maintaining software code that is only written to process a fixed, limited set of code words can be more straightforward and simple to write, which can make the software code less prone to user errors or mistakes as well.

Exemplary Lookup Table of Code Words and Corresponding Messages

Figure 5:
FIG. 5 illustrates an exemplary look up table of code words mapped to messages, according to some aspects of the disclosed technology.

FIG. 5 illustrates an exemplary lookup table 502 of code words mapped to messages, according to some aspects of the disclosed technology. Table 502 is an example of code word mapping 404 of FIG. 4, which maps different possible values of the code word to corresponding messages. In the example shown, the code word is encoded in 8-bits, and therefore has 256 possible values (e.g., from 0 to 255).

Not all code words must map to a message. Code word mapping may change over time and does not need to be static, as long as AV subsystems and user device(s) can agree to and/or share a common code word mapping. The number of possible code words, and possible corresponding messages are limited, and not unbounded. The messages can be canned messages, canned responses, and/or canned commands.

In some cases, a specific value of a code word can correspond to a message that includes a YES response (e.g., a positive response to a question or request). In some cases, a specific value of a code word can correspond to a message that includes a NO response (e.g., a negative response to a question or request). In some cases, a specific value of a code word can correspond to a message that includes an UNKNOWN message (e.g., an "I don't know" response to a question or request). In some cases, a specific value of a code word can correspond to a message that includes an UNSURE message (e.g., an "I'm not sure" response to a question or request). In some cases, a specific value of a code word can correspond to a message that includes a REPEAT message (e.g., a "Can you repeat that" response to a question or request). In some cases, a specific value of a code word can correspond to a message that includes a TIMEOUT message (e.g., no response to a question or request was received at user device(s) by a certain time period).

In some cases, a specific value of a code word can correspond to a specific error message (e.g., ERROR_101, ERROR_102, etc.).

In some cases, a specific value of a code word can correspond a message that includes a command to stop the autonomous vehicle, e.g., "stop AV as soon as practicable", or "pull over as soon as practicable".

In some cases, a specific value of a code word can correspond a message that includes a command to end a trip of a passenger in the autonomous vehicle, e.g., "I'd like to be dropped off as soon as it is safe to pull over".

In some cases, a specific value of a code word can correspond a message that includes a command to request remote assistance for a passenger in the autonomous vehicle, e.g., "Please connect me to a remote assistance agent".

In some cases, a specific value of a code word can correspond a message that includes a command to change a setting of an autonomous vehicle cabin system. The changing of a setting can be a command to increase/increment a setting or decrease/decrement a setting. Examples include: (1) increase cabin temperature by 1 degree Celsius, (2) decrease cabin temperature by 1 degree Celsius, (3) turn on seat warmer, (4) turn off seat warmer, (5) increment to next radio station on list, (6) decrement to next radio station on list, (7) skip to random radio station, (8) roll down left window, (9) roll up all windows, (10) lock the doors, (11) unlock the doors, and (12) open all doors, etc.

Computer-Implemented Methods for Improving Cybersecurity in an AV

Figure 6:
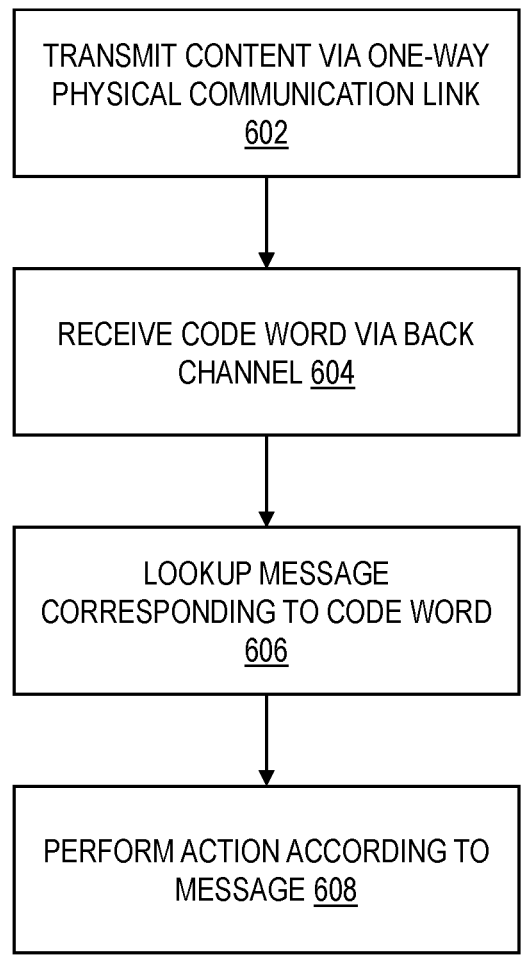
FIG. 6 is a flow diagram illustrating a method for improving cybersecurity in an autonomous vehicle, according to some aspects of the disclosed technology.

FIG. 6 is a flow diagram illustrating a computer-implemented method for improving cybersecurity in an autonomous vehicle, according to some aspects of the disclosed technology. In 602, one or more subsystems of an autonomous vehicle (e.g., AV subsystems 102 in the FIGURES) may transmit, to a user device (e.g., user device(s) 106 in the FIGURES), content via a one-way communication link (e.g., components 204 and 302 in the FIGURES), wherein the one-way communication link physically does not pass data traffic from the user device to the one or more subsystems of the autonomous vehicle. In 604, a message receiver of the autonomous vehicle may receive a code word from the user device via a backchannel (e.g., communication channel 220 of the FIGURES), wherein the code word corresponds to a specific message; In 606, the message receiver may look up a message corresponding to the code word. In 608, the one or more subsystems may perform an action according to the message.

Figure 7:
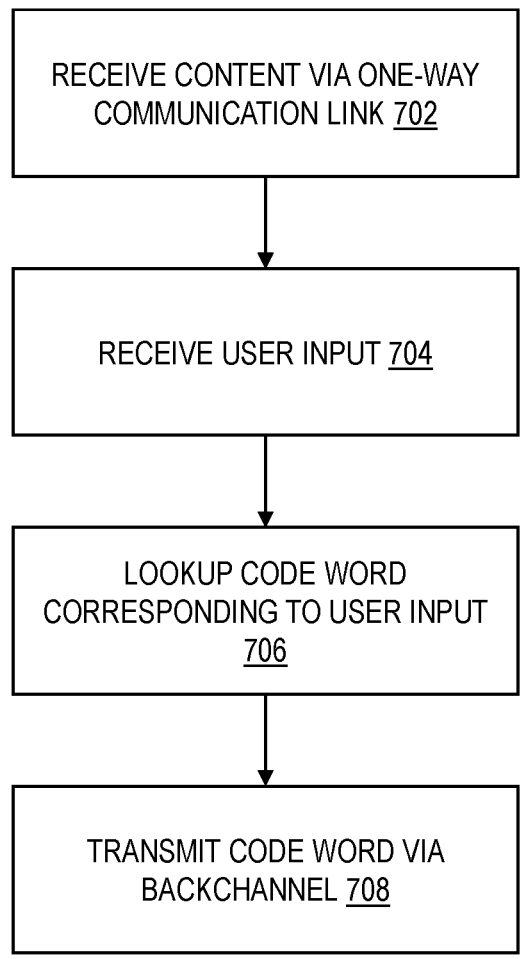
FIG. 7 is a flow diagram illustrating another method for improving cybersecurity in an autonomous vehicle, according to some aspects of the disclosed technology.

FIG. 7 is a flow diagram illustrating another computer-implemented method for improving cybersecurity in an autonomous vehicle, according to some aspects of the disclosed technology. In 702, a user device (e.g., user device(s) 106 in the FIGURES) may receive, from one or more subsystems of an autonomous vehicle (e.g., AV subsystems 102 in the FIGURES), content via a one-way communication link (e.g., components 204 and 302 in the FIGURES), wherein the one-way communication link physically does not pass data traffic from the user device to the one or more subsystems of the autonomous vehicle. In 704, the user device may determine a message to be conveyed to a message receiver of the autonomous vehicle. In 706, the user device may look up a code word that corresponds to the message. In 708, the user device may transmit, to the message receiver, the code word via a backchannel (e.g., communication channel 220 of the FIGURES) to cause the one of the one or more subsystems to perform an action according to the message.

Exemplary AV Management System

Figure 8:
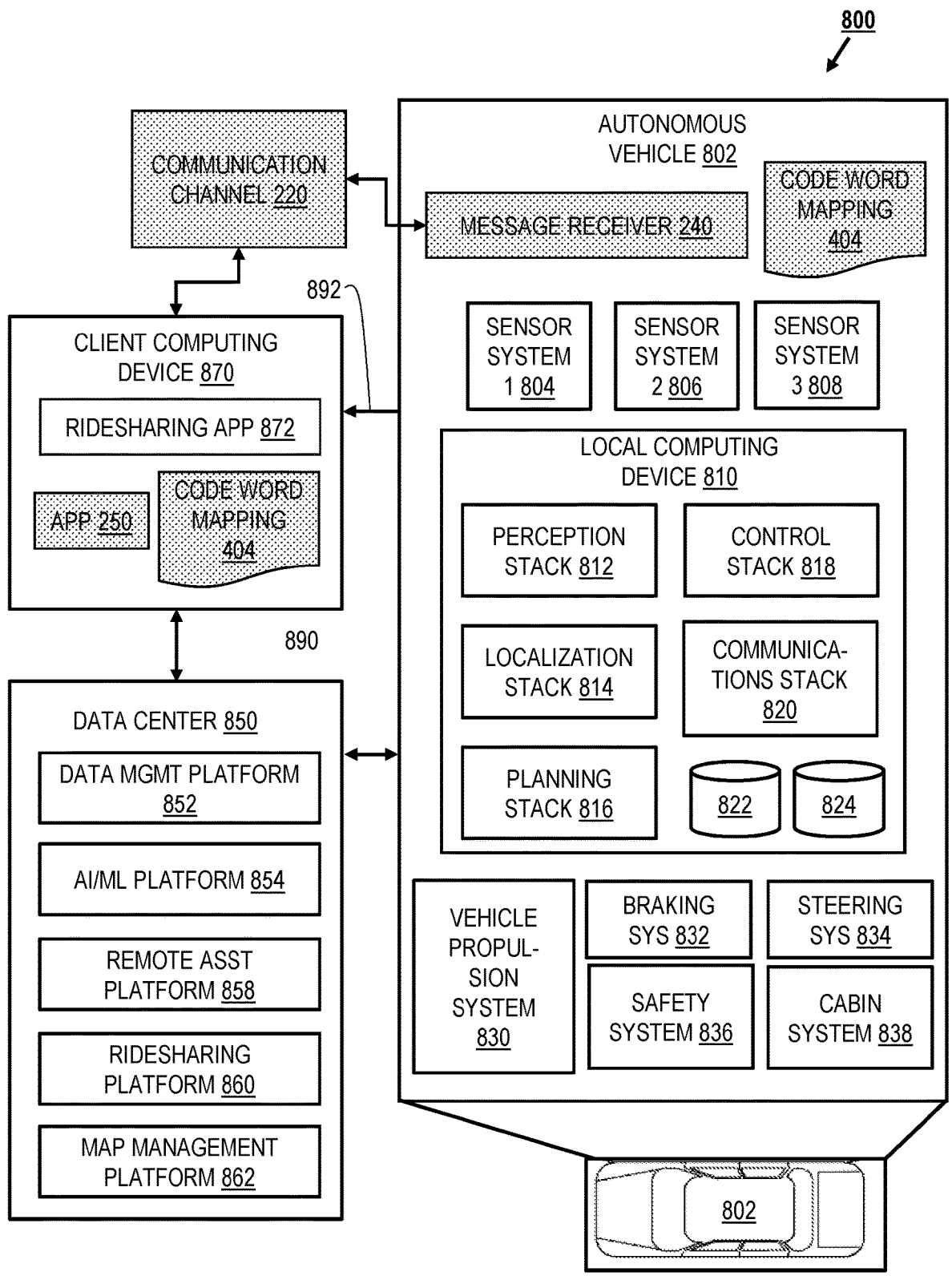
FIG. 8 illustrates an example system environment that may be used to facilitate autonomous vehicles (AV) operations, according to some aspects of the disclosed technology.

Turning now to FIG. 8, this figure illustrates an example of an AV management system 800, in which some of the aspects of the present disclosure can be implemented. One of ordinary skill in the art will understand that, for the AV management system 800 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 800 includes an AV 802, a data center 850, and a client computing device 870. The AV 802, and the data center 850 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

For security reasons, the AV 802 may communicate with client computing device 870 (e.g., user device(s) 106) via a hardware enforced one-way communication channel 892 as illustrated herein. The client computing device 870 may communicate to autonomous vehicle 802 via communication channel 220 as illustrated herein.

AV 802 may navigate about roadways without a human driver based on sensor signals generated by multiple sensor systems 804, 806, and 808. The sensor systems 804-708 may include different types of sensors and may be arranged about the AV 802. For instance, the sensor systems 804-808 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 804 may be a camera system, the sensor system 806 may be a LIDAR system, and the sensor system 808 may be a RADAR system. Other embodiments may include any other number and type of sensors.

AV 802 may also include several mechanical systems that may be used to maneuver or operate AV 802. For instance, the mechanical systems may include vehicle propulsion system 830, braking system 832, steering system 834, safety system 836, and cabin system 838, among other systems. Vehicle propulsion system 830 may include an electric motor, an internal combustion engine, or both. The braking system 832 may include an engine brake, a wheel braking system (e.g., a disc braking system that utilizes brake pads), hydraulics, actuators, and/or any other suitable componentry configured to assist in decelerating AV 802. The steering system 834 may include suitable componentry configured to control the direction of movement of the AV 802 during navigation. Safety system 836 may include lights and signal indicators, a parking brake, airbags, and so forth. The cabin system 838 may include cabin temperature control systems, in-cabin entertainment systems, and so forth. In some embodiments, the AV 802 may not include human driver actuators (e.g., steering wheel, handbrake, foot brake pedal, foot accelerator pedal, turn signal lever, window wipers, etc.) for controlling the AV 802. Instead, the cabin system 838 may include one or more client interfaces (e.g., GUIs, Voice User Interfaces (VUIs), etc.) for controlling certain aspects of the mechanical systems 830-838.

AV 802 may additionally include a local computing device 810 that is in communication with the sensor systems 804-808, the mechanical systems 830-838, the data center 850, and the client computing device 870, among other systems. The local computing device 810 may include one or more processors and memory, including instructions that may be executed by the one or more processors. The instructions may make up one or more software stacks or components responsible for controlling the AV 802; communicating with the data center 850, the client computing device 870, and other systems; receiving inputs from riders, passengers, and other entities within the AV's environment; logging metrics collected by the sensor systems 804-808; and so forth. In this example, the local computing device 810 includes a perception stack 812, a mapping and localization stack 814, a planning stack 816, a control stack 818, a communications stack 820, an HD geospatial database 822, and an AV operational database 824, among other stacks and systems.

Additionally, to support receiving codes sent from client computing device 870, autonomous vehicle 802 may include message receiver 240 as illustrated herein. Message receiver 240 may be implemented on local computing device 810. Autonomous vehicle 802 may further include code word mapping 404 as illustrated in FIG. 5. Message receiver 240 may perform code lookups using code word mapping 404 provided with autonomous vehicle 802.

Perception stack 812 may enable the AV 802 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 804-808, the mapping and localization stack 814, the HD geospatial database 822, other components of the AV, and other data sources (e.g., the data center 850, the client computing device 870, third-party data sources, etc.). The perception stack 812 may detect and classify objects and determine their current and predicted locations, speeds, directions, and the like. In addition, the perception stack 812 may determine the free space around the AV 802 (e.g., to maintain a safe distance from other objects, change lanes, park the AV, etc.). The perception stack 812 may also identify environmental uncertainties, such as where to look for moving objects, flag areas that may be obscured or blocked from view, and so forth.

Mapping and localization stack 814 may determine the AV's position and orientation (pose) using different methods from multiple systems (e.g., GPS, IMUs, cameras, LIDAR, RADAR, ultrasonic sensors, the HD geospatial database 822, etc.). For example, in some embodiments, the AV 802 may compare sensor data captured in real-time by the sensor systems 804-808 to data in the HD geospatial database 822 to determine its precise (e.g., accurate to the order of a few centimeters or less) position and orientation. The AV 802 may focus its search based on sensor data from one or more first sensor systems (e.g., GPS) by matching sensor data from one or more second sensor systems (e.g., LIDAR). If the mapping and localization information from one system is unavailable, the AV 802 may use mapping and localization information from a redundant system and/or from remote data sources.

The planning stack 816 may determine how to maneuver or operate the AV 802 safely and efficiently in its environment. For example, the planning stack 816 may receive the location, speed, and direction of the AV 802, geospatial data, data regarding objects sharing the road with the AV 802 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 802 from one point to another. The planning stack 816 may determine multiple sets of one or more mechanical operations that the AV 802 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 816 may select from multiple backup plans to carry out. For example, while preparing to change lanes to turn right at an intersection, another vehicle may aggressively cut into the destination lane, making the lane change unsafe. The planning stack 816 could have already determined an alternative plan for such an event, and upon its occurrence, help to direct the AV 802 to go around the block instead of blocking a current lane while waiting for an opening to change lanes.

The control stack 818 may manage the operation of the vehicle propulsion system 830, the braking system 832, the steering system 834, the safety system 836, and the cabin system 838. The control stack 818 may receive sensor signals from the sensor systems 804-808 as well as communicate with other stacks or components of the local computing device 810 or a remote system (e.g., the data center 850) to effectuate operation of the AV 802. For example, the control stack 818 may implement the final path or actions from the multiple paths or actions provided by the planning stack 816. Implementation may involve turning the routes and decisions from the planning stack 816 into commands for the actuators that control the AV's steering, throttle, brake, and drive unit.

The communication stack 820 may transmit and receive signals between the various stacks and other components of the AV 802 and between the AV 802, the data center 850, the client computing device 870, and other remote systems. The communication stack 820 may enable the local computing device 810 to exchange information remotely over a network. The communication stack 820 may also facilitate local exchange of information, such as through a wired connection or a local wireless connection.

The HD geospatial database 822 may store HD maps and related data of the streets upon which the AV 802 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only I am lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 824 may store raw AV data generated by the sensor systems 804-708 and other components of the AV 802 and/or data received by the AV 802 from remote systems (e.g., the data center 850, the client computing device 870, etc.). In some embodiments, the raw AV data may include HD LIDAR point cloud data, image or video data, RADAR data, GPS data, and other sensor data that the data center 850 may use for creating or updating AV geospatial data as discussed further below with respect to FIG. 5 and elsewhere in the present disclosure.

The data center 850 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 850 may include one or more computing devices remote to the local computing device 810 for managing a fleet of AVs and AV-related services. For example, in addition to managing the AV 802, the data center 850 may also support a ridesharing (or ridehailing) service, a delivery service, a remote/roadside assistance service, street services (e.g., street mapping, street patrol, street cleaning, street metering, parking reservation, etc.), and the like.

The data center 850 may send and receive various signals to and from the AV 802 and the client computing device 870. These signals may include sensor data captured by the sensor systems 804-808, roadside assistance requests, software updates, ridesharing (or ridehailing) pick-up and drop-off instructions, and so forth. In this example, the data center 850 includes one or more of a data management platform 852, an Artificial Intelligence/Machine Learning (AI/ML) platform 854, a simulation platform 856, a remote assistance platform 858, a ridesharing (or ridehailing) platform 860, and a map management platform 862, among other systems.

Data management platform 852 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing (or ridehailing) service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 850 may access data stored by the data management platform 852 to provide their respective services.

The AI/ML platform 854 may provide the infrastructure for training and evaluating machine learning algorithms for operating the AV 802, the simulation platform 856, the remote assistance platform 858, the ridesharing (or ridehailing) platform 860, the map management platform 862, and other platforms and systems. Using the AI/ML platform 854, data scientists may prepare data sets from the data management platform 852; select, design, and train machine learning models; evaluate, refine, and deploy the models; maintain, monitor, and retrain the models; and so on.

The remote assistance platform 858 may generate and transmit instructions regarding the operation of the AV 802. For example, in response to an output of the AI/ML platform 854 or other system of the data center 850, the remote assistance platform 858 may prepare instructions for one or more stacks or other components of the AV 802.

The ridesharing (or ridehailing) platform 860 may interact with a customer of a ridesharing (or ridehailing) service via a ridesharing (or ridehailing) application 872 and/or application 250 executing on the client computing device 870. The client computing device 870 (similar to user device(s) 106 in the FIGURES) may be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridesharing (or ridehailing) application 872 and/or application 250. The client computing device 870 may be a customer's mobile computing device or a computing device integrated with the AV 802 (e.g., the local computing device 810). The ridesharing (or ridehailing) platform 860 may receive requests to be picked up or dropped off from the ridesharing (or ridehailing) application 872 and dispatch the AV 802 for the trip. In some cases, the ridesharing (or ridehailing) application 872 may implement functionalities of application 250.

To transmit code(s) via communication channel 220 to autonomous vehicle 802, client computing device 870 may include or have access to code word mapping 404 (as illustrated in FIG. 5) or a derivation thereof.

Map management platform 862 may provide a set of tools for the manipulation and management of geographic and spatial (geospatial) and related attribute data. The data management platform 852 may receive LIDAR point cloud data, image data (e.g., still image, video, etc.), RADAR data, GPS data, and other sensor data (e.g., raw data) from one or more AVs 802, Unmanned Aerial Vehicles (UAVs), satellites, third-party mapping services, and other sources of geospatially referenced data. The raw data may be processed, and map management platform 862 may render base representations (e.g., tiles (2D), bounding volumes (3D), etc.) of the AV geospatial data to enable users to view, query, label, edit, and otherwise interact with the data. Map management platform 862 may manage workflows and tasks for operating on the AV geospatial data. Map management platform 862 may control access to the AV geospatial data, including granting or limiting access to the AV geospatial data based on user-based, role-based, group-based, task-based, and other attribute-based access control mechanisms. Map management platform 862 may provide version control for the AV geospatial data, such as to track specific changes that (human or machine) map editors have made to the data and to revert changes when necessary. Map management platform 862 may administer release management of the AV geospatial data, including distributing suitable iterations of the data to different users, computing devices, AVs, and other consumers of HD maps. Map management platform 862 may provide analytics regarding the AV geospatial data and related data, such as to generate insights relating to the throughput and quality of mapping tasks.

In some embodiments, the map viewing services of map management platform 862 may be modularized and deployed as part of one or more of the platforms and systems of the data center 850. For example, the AI/ML platform 854 may incorporate the map viewing services for visualizing the effectiveness of various object detection or object classification models, the simulation platform 856 may incorporate the map viewing services for recreating and visualizing certain driving scenarios, the remote assistance platform 858 may incorporate the map viewing services for replaying traffic incidents to facilitate and coordinate aid, the ridesharing (or ridehailing) platform 860 may incorporate the map viewing services into the client application 872 to enable passengers to view the AV 802 in transit enroute to a pick-up or drop-off location, and so on.

Exemplary Processor-Based System

Figure 9:
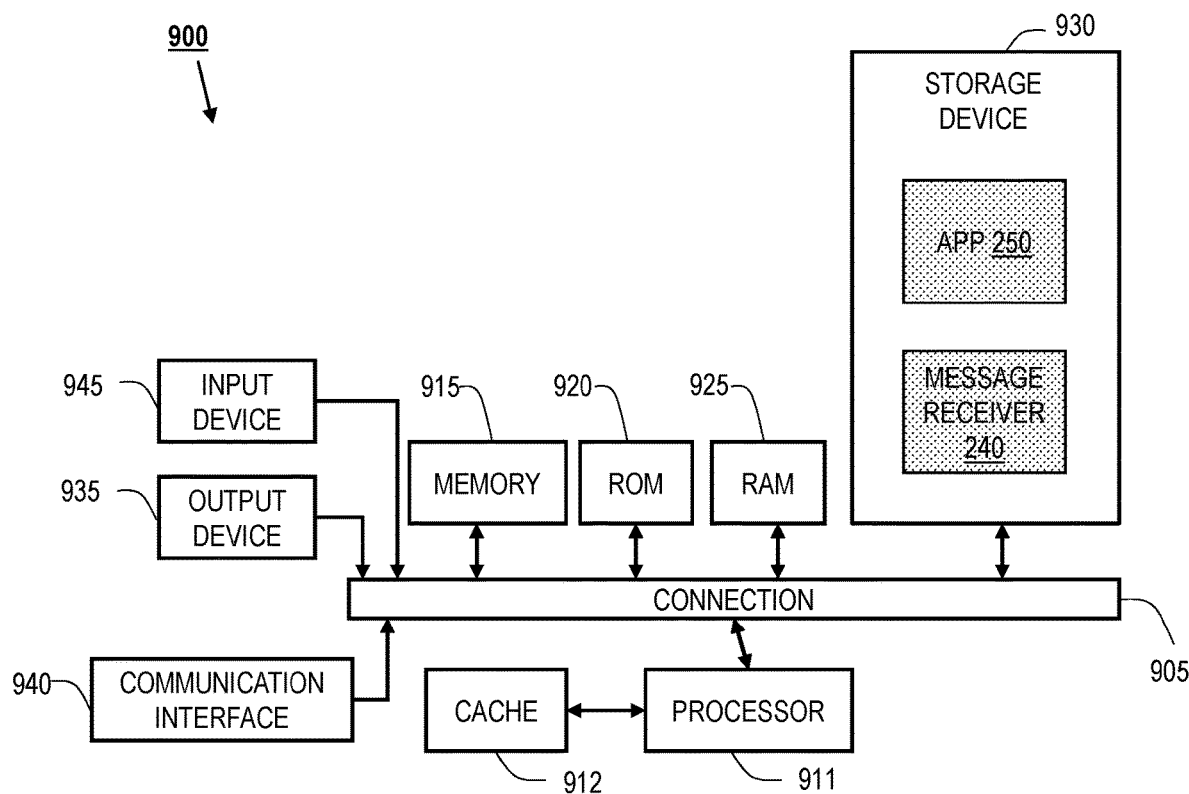
FIG. 9 illustrates an example processor-based system with which some aspects of the subject technology may be implemented.

FIG. 9 illustrates an example processor-based system with which some aspects of the subject technology may be implemented. For example, processor-based system 900 may be any computing device making up, or any component thereof in which the components of the system are in communication with each other using connection 905. Connection 905 may be a physical connection via a bus, or a direct connection into processor 910, such as in a chipset architecture. Connection 905 may also be a virtual connection, networked connection, or logical connection.

In some embodiments, computing system 900 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 900 includes at least one processing unit (Central Processing Unit (CPU) or processor) 910 and connection 905 that couples various system components including system memory 915, such as Read-Only Memory (ROM) 920 and Random-Access Memory (RAM) 925 to processor 910. Computing system 900 may include a cache of high-speed memory 912 connected directly with, in close proximity to, or integrated as part of processor 910.

Processor 910 may include any general-purpose processor and a hardware service or software service, implementing functionalities carried out by components 250 and/or 240 as illustrated in the FIGURES. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms known to those of skill in the art. In some instances, multimodal systems may enable a user to provide multiple types of input/output to communicate with computing system 900. Computing system 900 may include communications interface 940, which may generally govern and manage the user input and system output. The communication interface may perform or facilitate receipt and/or transmission wired or wireless communications via wired and/or wireless transceivers.

Communication interface 940 may also include one or more GNSS receivers or transceivers that are used to determine a location of the computing system 900 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 may be a non-volatile and/or non-transitory and/or computer-readable memory device and may be a hard disk or other types of computer-readable media which may store data that are accessible by a computer.

Storage device 930 may include software services, servers, services, etc., that when the code that defines such software is executed by the processor 910, it causes the system 900 to perform a function. In some embodiments, a hardware service that performs a particular function may include the software component stored in a computer-readable medium in connection with the necessary hardware components, such as processor 910, connection 905, output device 935, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

SELECT EXAMPLES

Example 1 is a computer-implemented method, the method comprising: transmitting, from one or more subsystems of an autonomous vehicle to a user device, content via a one-way communication link, wherein the one-way communication link physically does not pass data traffic from the user device to the one or more subsystems of the autonomous vehicle; receiving a code word, by a message receiver of the autonomous vehicle from the user device via a backchannel, wherein the code word corresponds to a specific message; looking up, by the message receiver, a message corresponding to the code word; and performing, by at least one of the one or more subsystems, an action according to the message.

In Example 2, the method of Example 1 can optionally include the one or more subsystems of the autonomous vehicle including one or more of: an autonomous vehicle compute system, autonomous vehicle sensors, an autonomous vehicle controls system, and an autonomous vehicle cabin system.

In Example 3, the method of Example 1 or 2 can optionally include the content including one or more of: data streams from one or more autonomous vehicle sensors; trip information from an autonomous vehicle compute system; driving maneuver information from the autonomous vehicle compute system; state information of an autonomous vehicle cabin system; and string messages to a passenger of the autonomous vehicle.

In Example 4, the method of any one of Examples 1-3 can optionally include the one-way communication link comprising an Ethernet switch, where a receive pin to receive a signal from the user device is physically removed.

In Example 5, the method of any one of Examples 1-4 can optionally include the one-way communication link comprises an Ethernet switch, where a transmit pin to transmit a signal to the one or more subsystems is physically removed.

In Example 6, the method of any one of Examples 1-5 can optionally include the one-way communication link comprising a data diode that ensures the data traffic only flows from a first network having the one or more subsystems of the autonomous vehicle to a second network having the user device.

In Example 7, the method of any one of Examples 1-6 can optionally include the code word being encoded in a data word that has less than or equal to 4 bits in bit width.

In Example 8, the method of any one of Examples 1-6 can optionally include the code word being encoded in a data word that has less than or equal to 8 bits in bit width.

In Example 9, the method of any one of Examples 1-6 can optionally include the code word being encoded in a byte of data.

In Example 10, the method of any one of Examples 1-9 can optionally include the message receiver having a lookup table that maps different values of the code word to corresponding messages.

In Example 11, the method of any one of Examples 1-10 can optionally include the corresponding message comprising a YES response.

In Example 12, the method of any one of Examples 1-10 can optionally include the corresponding message comprising a NO response.

In Example 13, the method of any one of Examples 1-10 can optionally include the corresponding message comprising an UNKNOWN message.

In Example 14, the method of any one of Examples 1-10 can optionally include the corresponding message comprising a command to stop the autonomous vehicle.

In Example 15, the method of any one of Examples 1-10 can optionally include the corresponding message comprising a command to end a trip of a passenger in the autonomous vehicle.

In Example 16, the method of any one of Examples 1-10 can optionally include the corresponding message comprising a command to change a setting of an autonomous vehicle cabin system.

In Example 17, the method of any one of Examples 1-16 can optionally include the backchannel being a daisy-chained communication bus used for transmitting audio data to devices communicably coupled to the daisy-chained communication bus.

In Example 18, the method of any one of Examples 1-17 can optionally include the backchannel being a daisy-chained communication bus primarily used for transmitting or transporting audio data.

In Example 19, the method of any one of Examples 1-18 can optionally include providing a lookup table that maps different values of the code word to corresponding messages to the user device via the one-way communication link.

In Example 20, the method of any one of Examples 1-19 can optionally include monitoring, by the message receiver, for one or more unexpected code words being received on the backchannel.

In Example 21, the method of Example 20 can optionally include in response to receiving the one or more unexpected code words, ceasing to process further code words received on the backchannel.

In Example 22, the method of Example 20 can optionally include in response to receiving the one or more unexpected code words, alerting the one or more subsystems of an anomaly.

Example 23 is a computer-implemented method, the method comprising: receiving, from one or more subsystems of an autonomous vehicle at a user device, content via a one-way communication link, wherein the one-way communication link physically does not pass data traffic from the user device to the one or more subsystems of the autonomous vehicle; determining a message to be conveyed to a message receiver of the autonomous vehicle; looking up a code word that corresponds to the message; and transmitting, from the user device to the message receiver, the code word via a backchannel to cause the one of the one or more subsystems to perform an action according to the message.

In Example 24, the method of Example 23 may optionally include any one of methods in Examples 1-18.

Example 23 is a computer-implemented system, comprising: one or more processing units; one or more non-transitory computer-readable media storing instructions, when executed by the one or more processing units, cause the one or more processing units to perform operations comprising operations of any one of the methods in Examples 1-24.

Example 24 is one or more non-transitory computer-readable media storing instructions, when executed by the one or more processing units, cause the one or more processing units to perform operations comprising operations of any one of the methods in Examples 1-24.

Example 25 is an apparatus comprising means for performing any one of the methods in Examples 1-24.

Example 26 is an autonomous vehicle, comprising: a first network having autonomous vehicle subsystems; a second network having a user device; a one-way communication link between the first network and the second network, wherein the one-way communication link physically does not pass data traffic from the second network to the first network; and a backchannel to transmit a code word from the user device to the autonomous vehicle subsystems, wherein the code word corresponds to a specific message.

The invention claimed is:

1. A computer-implemented method, the method comprising:
    transmitting, from one or more subsystems of an autonomous vehicle to a user device, content via a one-way communication link, wherein the one-way communication link physically does not pass data traffic from the user device to the one or more subsystems of the autonomous vehicle;
    receiving a code word, by a message receiver of the autonomous vehicle from the user device via a backchannel, wherein the code word corresponds to a specific message;
    determining, by the message receiver, the code word received on the backchannel to be an unexpected code word based on the code word being received during a time in which there is no passenger in the autonomous vehicle; and
    ceasing to process the unexpected code word.

2. The method of claim 1, wherein the one-way communication link comprises an Ethernet switch, where a receive pin to receive a signal from the user device is physically removed.

3. The method of claim 1, wherein the one-way communication link comprises an Ethernet switch, where a transmit pin to transmit a signal to the one or more subsystems is physically removed.

4. The method of claim 1, wherein the one-way communication link comprises a data diode that ensures the data traffic only flows from a first network having the one or more subsystems of the autonomous vehicle to a second network having the user device.

5. The method of claim 1, wherein the code word is encoded in a byte of data.

6. The method of claim 1, wherein the message receiver has a lookup table that maps different values of the code word to corresponding messages.

7. The method of claim 1, wherein the backchannel is a daisy-chained communication bus.

8. The method of claim 1, further comprising:
    providing a lookup table that maps different values of the code word to corresponding messages to the user device via the one-way communication link.

9. The method of claim 1, further comprising:
    in response to receiving the one or more unexpected code words, ceasing to process further code words received on the backchannel.

10. The method of claim 1, further comprising:
    in response to receiving the one or more unexpected code words, alerting the one or more subsystems of an anomaly.

11. The method of claim 1, further comprising ceasing to process the unexpected code word based on the code word being received during a time at which no code word is requested.

12. A computer-implemented method, the method comprising:
    receiving, from one or more subsystems of an autonomous vehicle at a user device, content via a one-way communication link, wherein the one-way communication link physically does not pass data traffic from the user device to the one or more subsystems of the autonomous vehicle;
    receiving, from the user device at a message receiver of the autonomous vehicle, a code word via a back channel;
    determining, by the message receiver, the code word received on the backchannel to be an unexpected code word based on the code word being received during a time in which there is no passenger in the autonomous vehicle; and
    ceasing to process the unexpected code word.

13. The method of claim 12, wherein:
    the one or more subsystems of the autonomous vehicle includes one or more of: an autonomous vehicle compute system, autonomous vehicle sensors, an autonomous vehicle controls system, and an autonomous vehicle cabin system; and
    the content includes one or more of:
    data streams from one or more autonomous vehicle sensors;

trip information from an autonomous vehicle compute system;

driving maneuver information from the autonomous vehicle compute system;

state information of an autonomous vehicle cabin system; and string messages to a passenger of the autonomous vehicle.

14. The method of claim 12, wherein the code word corresponds to a message comprising a YES response.

15. The method of claim 12, wherein the code word corresponds to a message comprising a NO response.

16. The method of claim 12, wherein the code word corresponds to a message comprising a command to end a trip of the passenger in the autonomous vehicle.

17. The method of claim 12, wherein the code word corresponds to a message comprising a command to change a setting of an autonomous vehicle cabin system.

18. An autonomous vehicle, comprising:
a first network having autonomous vehicle subsystems;
a second network having a user device;
a one-way communication link between the first network and the second network, wherein the one-way communication link physically does not pass data traffic from the second network to the first network;
a backchannel to transmit a code word from the user device to the autonomous vehicle subsystems, wherein the code word corresponds to a specific message; and
a message receiver of the first network to receive the code word received on the backchannel, wherein the message receiver is configured to determine the code word to be an unexpected code word based on the code word being received during a time in which there is no passenger in the autonomous vehicle and to cease processing of the unexpected code word.

19. The autonomous vehicle of claim 18, wherein the backchannel is a daisy-chained communication bus used for transmitting audio data to devices communicably coupled to the daisy-chained communication bus.

20. The autonomous vehicle of claim 18, wherein the one-way communication link is a one-way data diode.

* * * * *